United States Patent
Cho et al.

(10) Patent No.: US 10,366,973 B2
(45) Date of Patent: Jul. 30, 2019

(54) LAYOUT MODIFICATION METHOD FOR EXPOSURE MANUFACTURING PROCESS

(71) Applicant: Taiwan Semiconductor Manufacturing Co., Ltd., Hsinchu (TW)

(72) Inventors: Hung-Wen Cho, Hsinchu (TW); Fu-Jye Liang, Zhubei (TW); Chun-Kuang Chen, Guanxi Township, Hsinchu County (TW); Chih-Tsung Shih, Hsinchu (TW); Li-Jui Chen, Hsinchu (TW); Po-Chung Cheng, Zhongpu Township, Chiayi County (TW); Chin-Hsiang Lin, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/797,842

(22) Filed: Oct. 30, 2017

(65) Prior Publication Data
US 2019/0131290 A1 May 2, 2019

(51) Int. Cl.
*H01L 27/02* (2006.01)
*G06F 17/50* (2006.01)

(52) U.S. Cl.
CPC ...... *H01L 27/0207* (2013.01); *G06F 17/5045* (2013.01); *G06F 17/5068* (2013.01); *H01L 27/0203* (2013.01); *G06F 17/5009* (2013.01); *G06F 2217/12* (2013.01)

(58) Field of Classification Search
USPC ....................................................... 716/139
See application file for complete search history.

(56) References Cited

U.S. PATENT DOCUMENTS

2003/0229412 A1* 12/2003 White ............... G06F 17/5068
700/121
2009/0307649 A1* 12/2009 Pramanik ............... G03F 1/144
716/50

* cited by examiner

*Primary Examiner* — Mohammed Alam
(74) *Attorney, Agent, or Firm* — McClure, Qualey & Rodack, LLP

(57) ABSTRACT

A layout modification method for fabricating an integrated circuit is provided. The layout modification method includes calculating uniformity of critical dimension of a patterned layer with a layout for an exposure manufacturing process to produce a semiconductor device. The patterned layer is divided into a first portion and a second portion which is adjacent to the first portion, and a width of the second portion equals to a penumbra size of the exposure manufacturing process. The layout modification method further includes retrieving an adjusting parameter for modifying the layout of the semiconductor device; determining a compensation amount based on the adjusting parameter and the uniformity of critical dimension; and compensating the critical dimension of the second portion of the patterned layer by utilizing the compensation amount to generate a modified layout.

20 Claims, 7 Drawing Sheets

LAYOUT MODIFICATION METHOD FOR EXPOSURE MANUFACTURING PROCESS

BACKGROUND

Integrated circuits (ICs) have become increasingly important. Applications using ICs, such as cell phones, smartphones, tablets, laptops, notebook computers, PDAs, wireless email terminals, MP3 audio and video players, portable wireless web browsers and the like, are used by millions of people. Integrated circuits increasingly include powerful and efficient on-board data storage and logic circuitry for signal control and processing. In the course of IC evolution, functional density (i.e., the number of interconnected devices per chip area) has generally increased while geometric size (i.e., the smallest component (or line) that can be created using a fabrication process) has decreased. This scaling-down process generally provides benefits by increasing production efficiency and lowering the associated costs.

Various semiconductor processes have been used for manufacturing integrated circuits, and different pattern densities might be required for the semiconductor processes (especially the exposure manufacturing processes). Although existing exposure techniques have been generally adequate for their intended purposes, they have not been entirely satisfactory in when it comes to uniformly assessing exposure issues for advanced technology nodes.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1A:
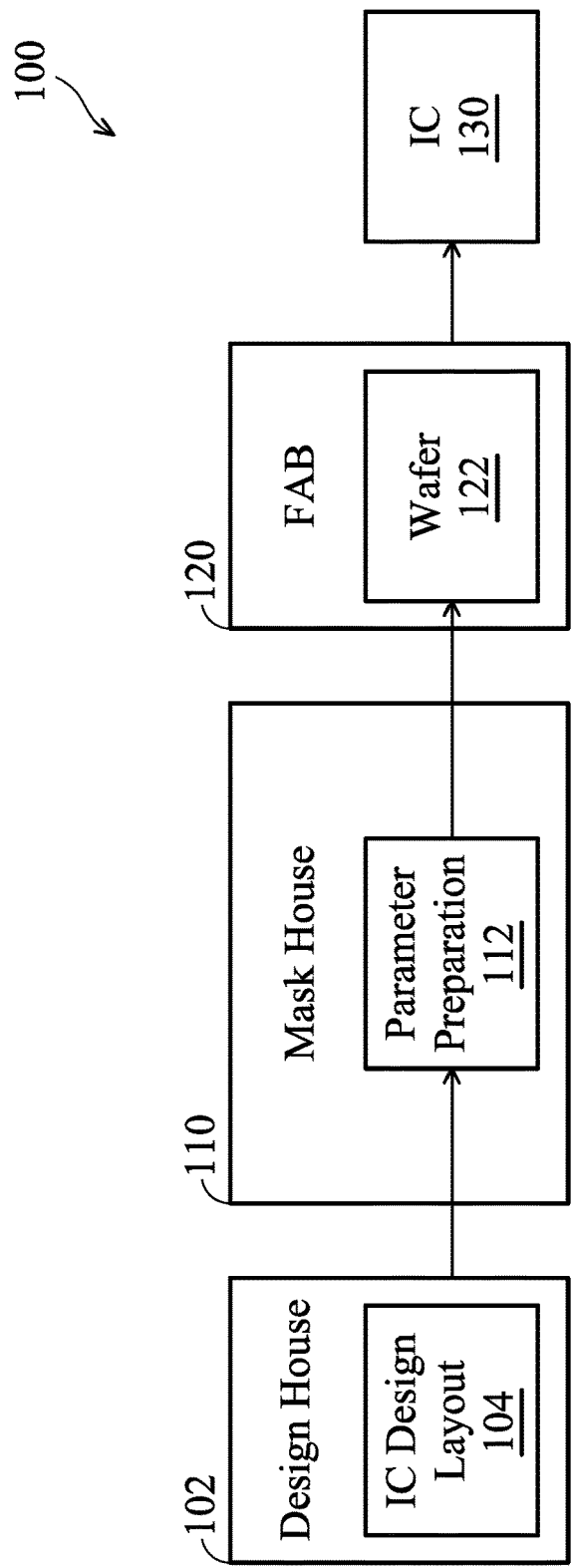
FIG. 1A is a simplified block diagram of an embodiment of an integrated circuit (IC) manufacturing system and an associated IC manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Additional features can be added to the semiconductor device. Some of the features described below can be replaced or eliminated for different embodiments. Although some embodiments are discussed with operations performed in a particular order, these operations may be performed in another logical order.

FIG. 1A is a simplified block diagram of an embodiment of an integrated circuit (IC) manufacturing system 100 and an associated IC manufacturing flow, which may benefit from various aspects of the present disclosure. The IC manufacturing system 100 includes a plurality of entities, such as a design house 102, a mask house 110, and an IC manufacturer 120 (i.e., a fab), that interact with one another in the design, development, and manufacturing cycles and/or services related to manufacturing an integrated circuit (IC) 130. The IC 130 may include a plurality of semiconductor devices.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electron IC design layout automation (EDA) tools, the library elements are mapped on to pre-defined layout cells, which contain prefigured elements such as transistors. The cells are chosen with the particular semiconductor process nodes and parameters in mind and create a process parameterized physical representation of the design. The design flow continues from that point by performing placement and routing of the local and global connections needed to form the completed design using the standard cells.

After design rule checks, design rule verification, timing analysis, critical path analysis, static and dynamic power analysis, and final modifications to the design, a tape out process is performed to produce photomask generation data. This photomask generation (PG) data is then used to create the optical masks used to fabricate the semiconductor device in a photolithographic process at a wafer fabrication facility (FAB). In the tape out process, the database file of the IC is converted into a Graphic Database System (GDS) file (e.g., a GDS file or a GDSII file). The GDS file is then used to make various layers of masks for integrated circuit manufacturing. Specifically, the GDS file became the industry's standard format for transfer of IC layout data between design tools of different vendors.

The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 102, the mask house 110, and the IC manufacturer 120 may be owned by a single larger company, and may even coexist in a common facility and use common resources.

The design house (or design team) 102 generates an IC design layout 104. In some embodiments, the IC design layout 104 includes processing data which are used in semiconductor processes for manufacturing the IC 130. The processing data could include at least one design parameter and at least one exposure parameter of an exposure manufacturing process of a thin film of a semiconductor device of the IC 130. For example, the design parameter could be pattern-density (PD).

The mask house 110 uses the IC design layout to manufacture one or more masks to be used for fabricating various layers of the IC 130. The mask house 110 performs parameter preparation 112, and other suitable tasks. The parameter preparation 112 translates the IC design layout 104 into a form that can be physically written by a mask writer. The mask house 110 then fabricates a plurality of masks that are used for patterning a substrate (e.g., a wafer).

The IC design layout 104 may further include various geometrical patterns designed for the IC 130. The geometrical patterns correspond to patterns of metal, oxide, or semiconductor layers that make up the various components of the IC 130 to be fabricated. The various layers combine to form various IC features. For example, a portion of the IC design layout 104 includes various IC features, such as active regions, gate electrodes, sources and drains, metal lines or vias of an interlayer interconnection, and openings for bonding pads, to be formed in a semiconductor substrate (such as a silicon wafer) and various material layers disposed on the semiconductor substrate. The design house 102 implements a proper design procedure to form the IC design layout 104. The design procedure may include logic design, physical design, and/or place and route.

The mask house 110 is utilized to determine processing parameters including an adjusting parameter and/or a compensation index. The determined processing parameters are utilized to generate a mask, and the mask is transmitted to the FAB 120. Therefore, the exposure manufacturing process is performed on the wafer 122 in the FAB 120 according to the processing parameters which were determined by the mask house 110.

The mask house 110 includes a parameter preparation 112, and the parameter preparation 112 receives the IC design layout 104 from the design house 102 to generate processing parameters for manufacturing the semiconductor devices on the wafer 122. Specifically, the adjusting parameter is utilized for modifying the layout of the semiconductor device. In some embodiments, the adjusting parameter is a Mask Error Enhancement Factor (MEEF) which is utilized for optical proximity correction of the exposure manufacturing process of the semiconductor device. The compensation index is utilized for multiplying the compensation amount to generate a modified layout. The compensation index is related to the area of the patterned layer.

The parameter preparation 112 may include additional modules, such as optical proximity correction (OPC), mask rule checker, lithography process checker, and other resolution enhancement techniques (RET), which are not shown here. As lithography exposure using deep ultraviolet light (such as 193 nm) approaches its resolution limits, various techniques are devised for extending the usable life of the existing lithography tools. One of the techniques is mandrel spacer patterning. In this technique, a mandrel pattern is formed using an exposure, and a spacer pattern is formed on sidewalls of the mandrel pattern. Then, the mandrel pattern is removed and the spacer pattern is used for further patterning steps in order to form a final pattern. The pitch of the spacer pattern is reduced to only half of that of the mandrel pattern, thereby increasing the resolution of the patterning process.

In some embodiments, the mask house 110 may further include lithography process checking (LPC) that simulates processing that will be implemented by the FAB 120 to fabricate the IC 130. The LPC may simulate this processing based on the IC design layout 104 to create a simulated manufactured device, such as the IC 130. The processing parameters in LPC simulation may include parameters associated with various processes of the IC manufacturing cycle, parameters associated with tools used for manufacturing the IC, and/or other aspects of the manufacturing process. By way of example, LPC may take into account various factors, such as aerial image contrast, depth of focus ("DOF"), mask error enhancement factor ("MEEF"), other suitable factors, or combinations thereof. The simulated processing (e.g., implemented by the LPC) can be used to provide for the generation of a process-aware rule table (e.g., for SRAF insertions). Thus, an SRAF rule table may be generated for the IC design layout 104, with consideration of the processing conditions of the mask house 110.

After parameter preparation 112 in the mask house 110 modifies the IC design layout 104, a modified layout or a group of modified layouts are fabricated. For example, an electron-beam (e-beam) or a mechanism of multiple e-beams is used to form a pattern on a mask (photomask or reticle) based on the modified layout. In addition, the mask can be formed based on the modified layout in various technologies. For example, the mask may be formed using binary technology to include opaque regions and transparent regions. A radiation beam (such as an ultraviolet (UV) beam), used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In a phase shift mask (PSM), various features in the pattern formed on the mask are configured to have proper phase difference to enhance the resolution and imaging quality.

The IC manufacturer 120, such as a semiconductor foundry, uses the mask generated by the mask house 110 to fabricate the IC 130. The IC manufacturer 120 is an IC fabrication business that can include a myriad of manufacturing facilities for the fabrication of a variety of different IC products. For example, there may be a first manufacturing facility for the front end fabrication of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business.

In the present embodiment, a wafer 122 is fabricated using a mask to form the IC 130. The semiconductor wafer includes a silicon substrate or another proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The wafer 122 may further include various doped regions, dielectric features, and multilevel interconnects (formed at subsequent manufacturing steps).

Figure 1B:
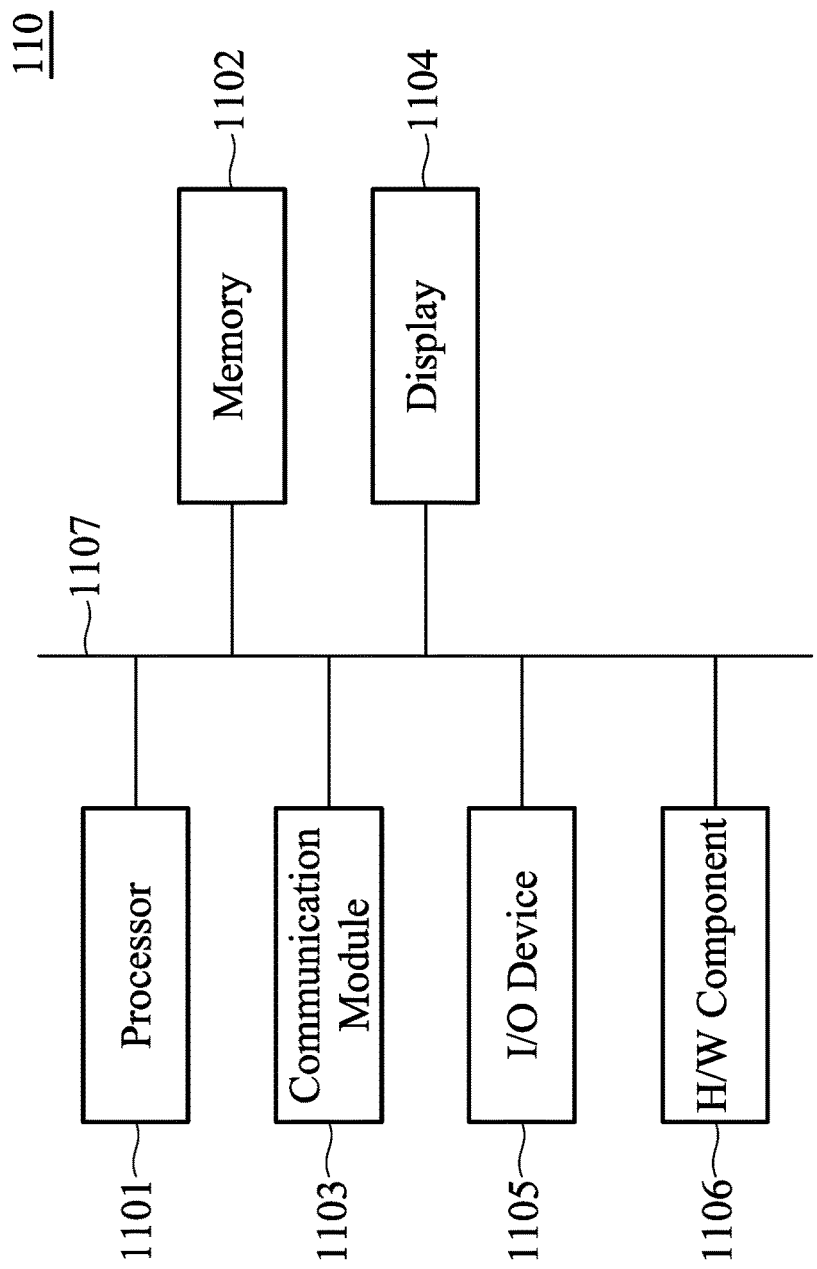
FIG. 1B is a more detailed block diagram of the exposure system shown in FIG. 1 according to various aspects of the present disclosure.
Figure 4:
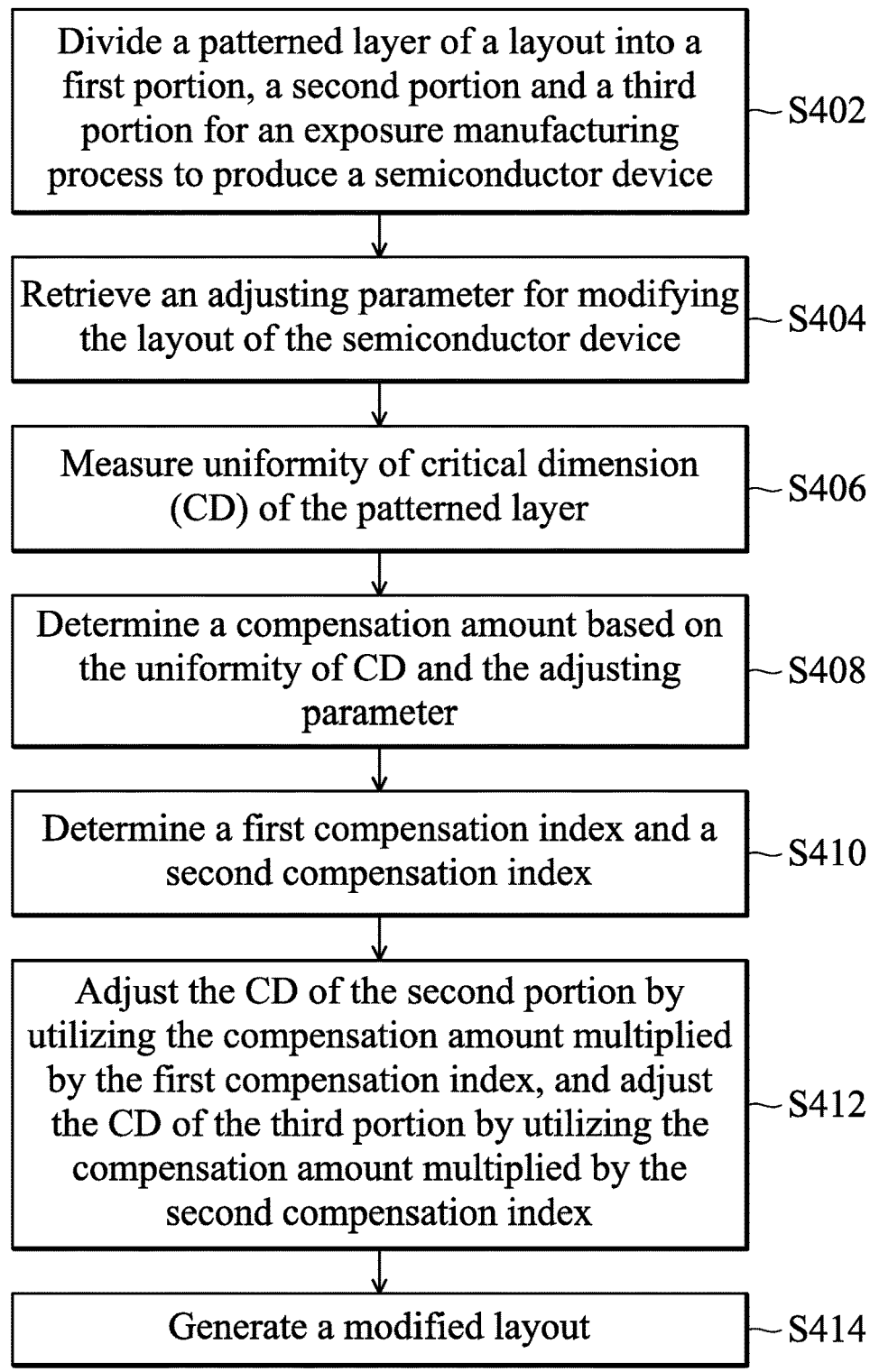
FIG. 4 is a flow chart illustrating the layout modification method of an exposure manufacturing process for fabricating an integrated circuit (IC), in accordance with some embodiments.

FIG. 1B is a more detailed block diagram of the mask house 110 shown in FIG. 1A according to various aspects of the present disclosure. One or more of the tools and systems and operations described with respect to FIG. 4 is realized in some embodiments by the mask house 110 of FIG. 1B. The exposure system 100 includes a processor 1101, a memory 1102, a network interface (I/F) 1103, a display 1104, an input/output (I/O) device 1105, and one or more hardware components 1106 communicatively coupled via a bus 1107 or another interconnection communication mechanism.

The processor 1101 may include a digital signal processor (DSP), a microcontroller (MCU), a central-processing unit (CPU) or a plurality of parallel processors relating the parallel processing environment to implement the operating system (OS), firmware, driver and/or other applications of the mask house 110.

The memory 1102 comprises, in some embodiments, a random access memory (RAM) or another dynamic storage device or read only memory (ROM) or other static storage devices, coupled to the bus 1107 for storing data and/or instructions to be executed by the processor 1101. The memory 1102 is also used, in some embodiments, for storing temporary variables or other intermediate information during the execution of instructions to be executed by the processor 1101.

The communication module 1103 is operable to communicate information such as IC design layout files with the other components in the IC manufacturing system 100, such as design house 102. Examples of communication modules may include Ethernet cards, 802.11 WiFi devices, cellular data radios, and/or other suitable devices known in the art.

The display 1104 is utilized to display the processing data and processing parameter the IC 130. The display 1104 can be a liquid-crystal panel or a touch display panel. The I/O device 1105 includes an input device, an output device and/or a combined input/output device for enabling user interaction with the mask house 110. An input device comprises, for example, a keyboard, keypad, mouse, trackball, trackpad, and/or cursor direction keys for communicating information and commands to the processor 1101. An output device comprises, for example, a display, a printer, a voice synthesizer, etc. for communicating information to the user.

Figure 2A:
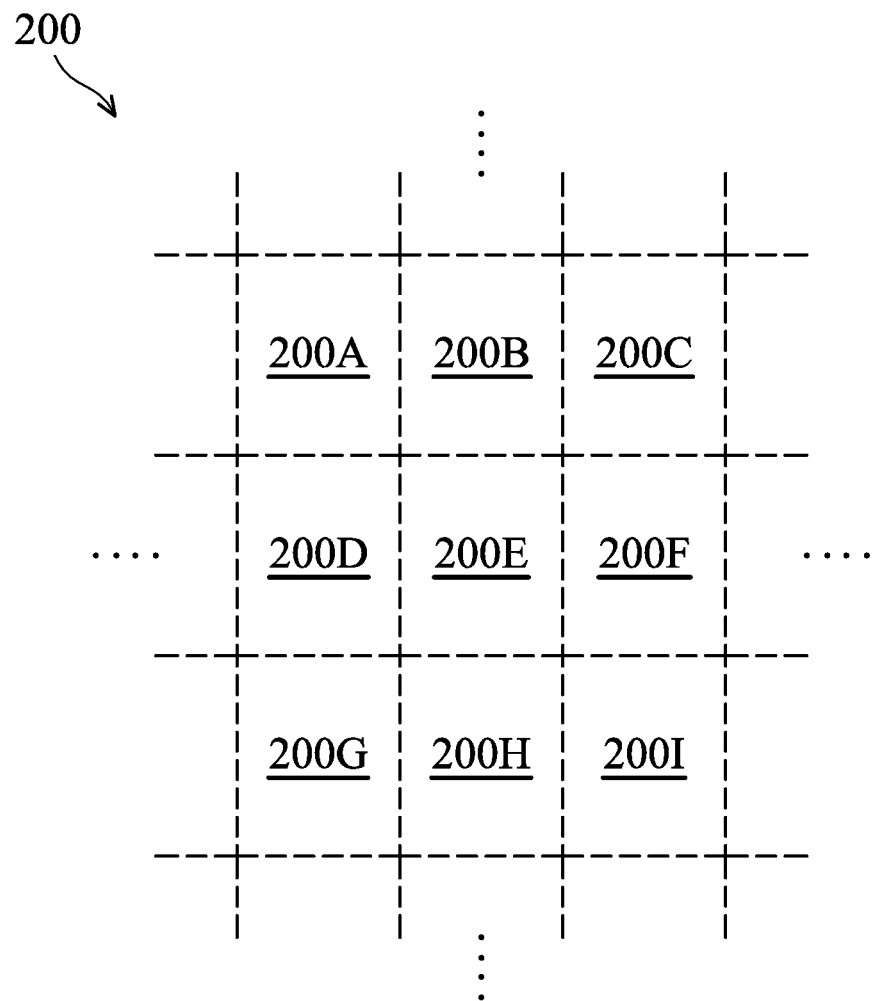
FIG. 2A is a schematic diagram of a semiconductor device for executing a series of exposure manufacturing process, in accordance with some embodiments.

FIG. 2A is a schematic diagram of a semiconductor device 200 for executing a series of exposure manufacturing processes, in accordance with some embodiments. The layout of the semiconductor device 200 could be divided into a plurality of regions 200A~200I. Each of the regions 200A~200I is formed in a polygon shape. In some embodiments, each of the regions 200A~200I is formed in a rectangle shape. The exposure manufacturing processes are executed for each of the regions 200A~200I sequentially. For example, the region 200A is exposed with a light source, then the region 200B is exposed by the light source, then the region 200C is exposed by the light source and so on.

Specifically, a pellicle (i.e., a transparent thin film) is utilized to cover the regions 200A~200I in order to prevent the semiconductor device 200 from being damaged by particles. However, a portion of light from the light source will be reflected by the pellicle, especially the out-of-band light which is transmitted by the light source but not utilized for the exposure manufacturing process. The reflected light might result in uniformity for the exposure manufacturing process.

After the regions 200A~200I are covered by the pellicle, the exposure manufacturing process may be executed for each of the regions 200A~200I sequentially. Specifically, a plurality of blades are utilized to expose the light for a specific region and block the light for other regions (which means other regions will not be exposed by the light). For example, when the exposure manufacturing process is performed for the region 200B, several blades are arranged along the four edges of the region 200B to block and obstruct the light transmitted from the light source. The above blades may not completely block the light during the exposure manufacturing process, and the light leakage will be generated accordingly and affect other surrounding regions. For example, the light leakage of the region 200B will affect its surrounding regions 200A, 200C and 200E. Therefore, regarding the regions 200A, 200C and 200E, their edge areas adjacent to the region 200B will suffer non-uniformity, which is caused by the pellicle and the light leakage from the region 200B.

Figure 2B:
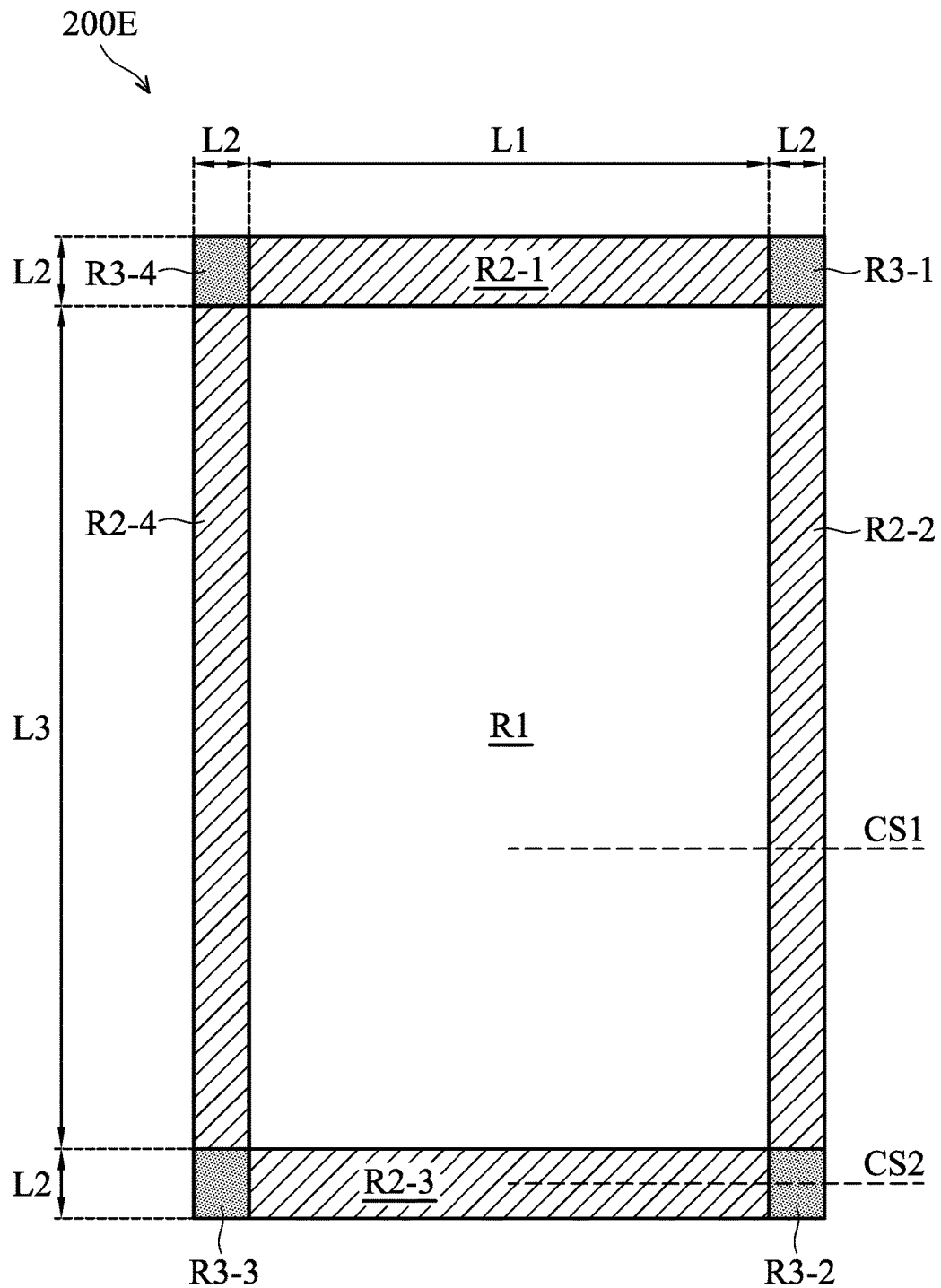
FIG. 2B is a schematic diagram of a semiconductor device with a layout, in accordance with some embodiments.

FIG. 2B is a schematic diagram of a region 200E of the semiconductor device 200, in accordance with some embodiments. In some embodiments, the region 200E may be divided into several portions. As shown in FIG. 2B, the region 200E is divided into a portion R1, a portion R2 and a portion R3. The portion R2 is adjacent to the portion R1, and the portion R3 is adjacent to the portion R2. The portion R2 includes four portions R2-1, R2-2, R2-3 and R2-4. The portion R3 includes four portions R3-1, R3-2, R3-3 and R3-4.

In the embodiment of FIG. 2B, the shape of the region 200E is a polygon. More specifically, the shape of the region 200E is a rectangle. The portion R1 is the central portion of the rectangle, the portions R2-1, R2-2, R2-3 and R2-4 are the edge portions of the rectangle, and the portions R3-1, R3-2, R3-3 and R3-4 are the corner portions of the rectangle. As shown in FIG. 2B, each of the portions R3-1, R3-2, R3-3 and R3-4 is a square, and the length of the square is L1. Each of the portions R2-1 and R2-3 is a rectangle, width of the rectangle is L2, and length of the rectangle is L1. Each of the portions R2-2 and R2-4 is a rectangle, width of the rectangle is L2, and length of the rectangle is L3. The portion R1 is a rectangle with length L3 and width L1. More specifically, L3 is greater than L2, and L2 is greater than L1. In other embodiments, the portion R1 is a square with length of L1. The portions R2-1, R2-2, R2-3 and R2-4 are rectangles which are identical with each other.

In some embodiments, the portions R2-1, R2-2, R2-3 and R2-4 are penumbra areas which are affected by the light leakage caused by exposure manufacturing processes of other surrounding regions 200A~200D and 200F~200I of the region 200E. More specifically, the portion R2-1 is affected by the light leakage caused by the exposure manufacturing process of the region 200B, the region R2-2 is affected by the light leakage caused by the exposure manufacturing process of the region 200F, the region R2-3 is affected by the region 200H, and the region R2-4 is affected by the light leakage caused by the exposure manufacturing process of the region 200D.

In other words, the width L2 of each of the portions R2-1, R2-2, R2-3 and R2-4 is equal to the penumbra size. The penumbra size is utilized to indicate which area of the patterned layer is affected by light leakage from another exposure manufacturing process. Furthermore, the penumbra size can be calculated and simulated according to the category of light source, the intensity of the light source, the material of the blades, the distance between the light source and the blade, and the distance between the blade and the semiconductor device 200.

In addition, the portions R3-1, R3-2, R3-3 and R3-4 are the corner portions of the rectangle. More specifically, the portion R3-1 is affected by the light leakage caused by the exposure manufacturing process of the surrounding regions 200B, 200C and 200F of the region 200E. The portion R3-2 is affected by the light leakage caused by the exposure manufacturing process of the surrounding regions 200F, 200H and 200I of the region 200E. The portion R3-3 is affected by the light leakage caused by the exposure manufacturing process of the surrounding regions 200D, 200G and 200H of the region 200E. The portion R3-4 is affected by the light leakage caused by the exposure manufacturing process of the surrounding regions 200A, 200B and 200D of the region 200E.

Figure 2C:
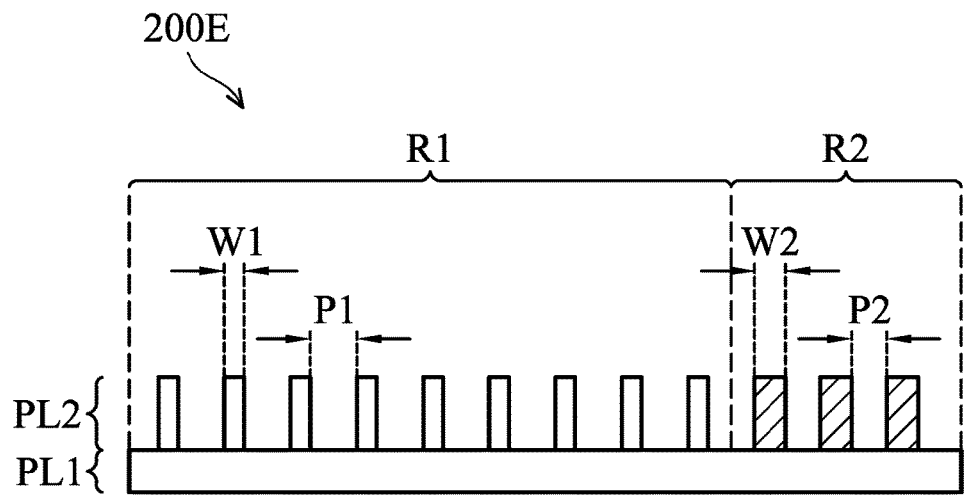
FIG. 2C is a schematic diagram of a semiconductor device illustrating the patterned layer, in accordance with some embodiments.

FIG. 2C is a schematic diagram of a modified layout of a semiconductor device illustrating the patterned layer after compensation, in accordance with some embodiments, along the cross section CS1 of the FIG. 2B. In some embodiments, the semiconductor device 200 includes two patterned layers PL1 and PL2. The patterned layer PL2 is formed above the patterned layer PL1, the patterned layer PL1 can be formed above the wafer 122. For example, the patterned layer PL1 is a metal layer, and the patterned layer PL2 includes a plurality of absorbers.

Each of the absorbers of the patterned layer PL2 is designed to have the same width and the distance between any two of the adjacent absorbers (also known as the pitch) is designed to be the same. The critical dimension (CD) can be determined by measuring the width or the pitch of the absorbers of the patterned layer PL2. However, because of the effects of the light leakage and reflection in the penumbra area, the widths of the absorbers on the penumbra area will be different from the widths of the absorbers which are not on the penumbra area.

For example, the widths of the absorbers on the portion R2 are larger than the widths of the absorbers on the portion R1 by 1 nm. In other words, the pitches of the absorbers on the portion R2 are less than the pitches of the absorbers on the portion R1 by 1 nm. Accordingly, a variety amount (ΔCD) of 1 nm could be measured or simulated in order to evaluate the uniformity of the CD in the regions R1, R2 and R3 for the region 200E of the semiconductor device 200. Therefore, the uniformity of the patterned layer PL2 deteriorates, and a layout modification method is needed to compensate for the non-uniformity.

In some embodiments, an adjusting parameter for modifying the layout of the semiconductor device 200 could be retrieved from the mask house 110 by the processor 1101. In some embodiments, the adjusting parameter is a Mask Error Enhancement Factor (MEEF) which is utilized for optical proximity correction of the exposure manufacturing process of the semiconductor device 200.

Afterwards, the processor 1101 determines a compensation amount (CA) based on the adjusting parameter and the uniformity of CD, and compensates the CD of the second portion of the patterned layer by utilizing the compensation amount to generate a modified layout. Specifically, the compensation amount is determined by dividing variety amount (ΔCD) (i.e., the uniformity of CD) by the adjusting parameter, which is illustrated as the equation (1).

$$\text{CompensationAmount(CA)} = \Delta CD \div \text{MEEF} \quad (1)$$

For example, when the variety amount (ΔCD) is 1 nm which represents the degree of the uniformity of CD and the MEEF of 2 is provided, the CA will be 0.5 nm by the calculation of the equation (1).

In some embodiments, the CD of the portion R2 of the patterned layer is compensated by increasing a pattern width of the portion R2 or decreasing a pattern pitch of the portion R2 with the compensation amount which is multiplied by a first compensation index (C1). The first compensation index C1 is a positive value within a range of 0.5~2. The first compensation index C1 is related to the parameters of the exposure manufacturing process and the position within the layout. For example, the first compensation index C1 is 1. The above compensation could be illustrated by the following equations (2) and (3).

$$W2 = W1 + (CA \times C1) \quad (2)$$

$$P2 = P1 - (CA \times C1) \quad (3)$$

In some embodiments, C1 is 1, CA is 0.5 nm, width W1 is 40 nm, and pitch P1 is 80 nm. By utilizing the equations (1)~(3), width W2 will be 40.5 nm, and pitch P2 will be 79.5 nm. As shown in the modified layout of FIG. 2C, the width W2 in the portion R2 is larger than the width W1 in the portion R1. The difference of 0.5 nm is determined by the compensation amount CA and the first compensation index C1 to compensate for the non-uniformity caused during the exposure manufacturing process. Due to the compensation, the non-uniformity between the portions R1 and R2 of the modified layout could be decreased.

Figure 2D:
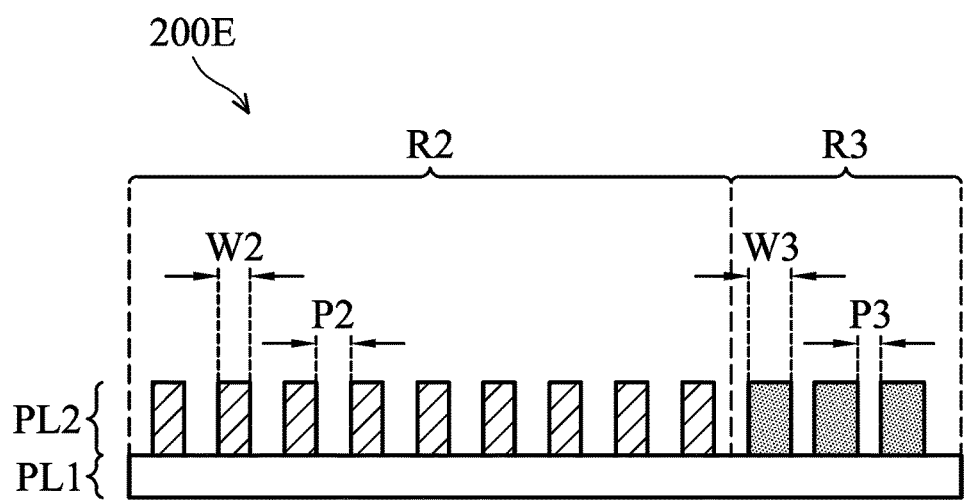
FIG. 2D is a schematic diagram of a semiconductor device illustrating the patterned layer, in accordance with some embodiments.

FIG. 2D is a schematic diagram of a modified layout of a semiconductor device 200 illustrating the patterned layer after compensation, in accordance with some embodiments. In some embodiments, the CD of the portion R3 of the patterned layer is compensated by increasing a pattern width of the portion R3 or decreasing a pattern pitch of the portion R3 with the compensation amount which is multiplied by a second compensation index C2. The second compensation index C2 is greater than the first compensation index C1.

The second compensation index C2 is a positive value within a range of 2~5. The second compensation index C2 is related to the parameters of the exposure manufacturing process and the position within the layout. For example, the second compensation index C2 is 3. The above compensation could be illustrated by the following equations (4) and (5).

$$W3=W1+(CA \times C2) \quad (4)$$

$$P3=P1-(CA \times C2) \quad (5)$$

For example, C2 is 3, CA is 0.5 nm, W1 is 40 nm, and pitch P1 is 80 nm. By utilizing the equations (1)~(5), width W3 will be 41.5 nm, and pitch P3 will be 78.5 nm. As shown in the modified layout of FIG. 2D, the width W3 in the portion R3 is larger than the width W1 in the portion R1. The difference of 1.5 nm is determined by the CA and C2 to compensate for the non-uniformity caused during the exposure manufacturing process. Due to the compensation, the non-uniformity between the portions R1 and R3 could be decreased.

Because the portion R3 is the corner of the region 200E and the portion R2 is the edge of the region 200E, the portion R3 suffers more light leakage from other surrounding regions 200A~200I than the portion R2. For example, the portion R3-1 could be affected by three surrounding regions 200B, 200C and 200F. The portion R2-1 could be affected by one surrounding region 200B. Accordingly, the second compensation index C2 is greater than the first compensation index C1. For example, the second compensation index C2 is triple of the first compensation index C1. Therefore, the CA for the portion R3 will be greater than the CA for the portion R2 in order to obtain an overall uniformity for the region 200E.

By utilizing the proposed layout modification method, the non-uniformity could be compensated and improved without arranging another thin film to absorb the light reflection and light leakage. Therefore, the efficiency and throughput of the exposure manufacturing process will not be sacrificed.

Figure 3:
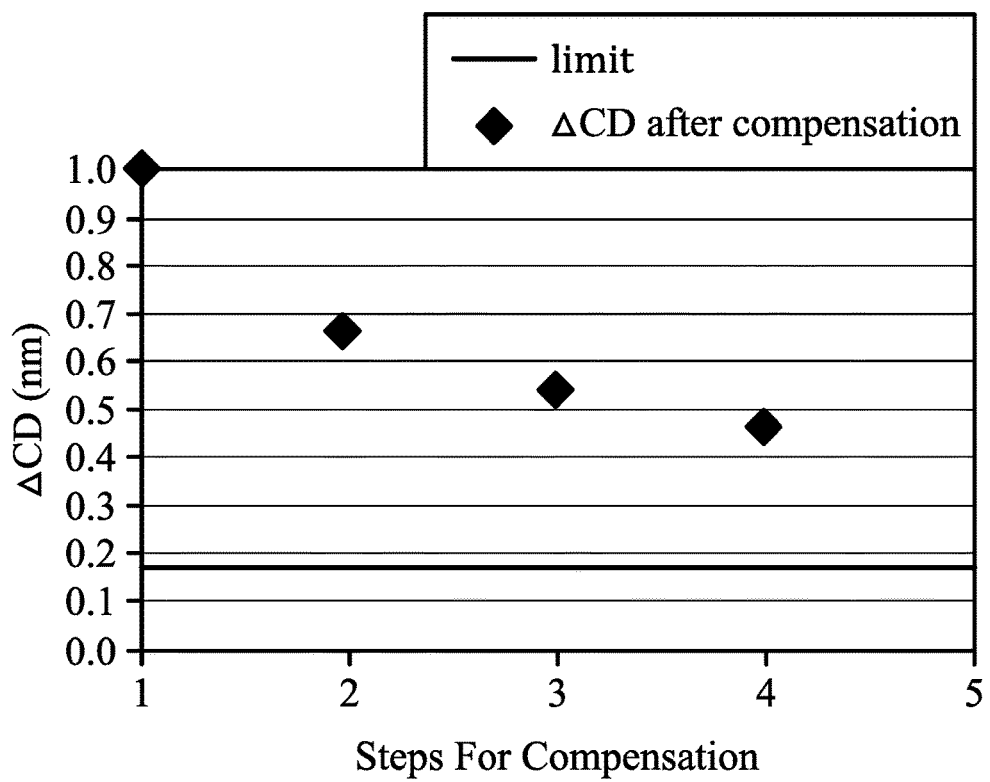
FIG. 3 is a schematic diagram illustrating the relation between uniformity of critical dimensions and different steps of compensation, in accordance with some embodiments.

FIG. 3 is a schematic diagram illustrating the relationship between the uniformity of critical dimensions and the different steps of compensation, in accordance with some embodiments. The variety amount ΔCD before compensation is 2 nm. As shown in FIG. 3, after the first compensation, the variety amount ΔCD is 1 nm. Afterwards, second compensation is executed after the first compensation, and the variety amount ΔCD is decreased to be around 0.67 nm. If more compensations are executed, the variety amount ΔCD could be further decreased to 0.18 nm as shown in FIG. 3. Therefore, the variety amount ΔCD is effectively compensated for by the proposed layout modification method.

FIG. 4 is a flow chart illustrating the layout modification method of an exposure manufacturing process for fabricating an integrated circuit (IC), in accordance with some embodiments. In operation S402, the processor 1101 divides a patterned layer PL2 of a layout into a first portion (the portion R1), a second portion (the portion R2) and a third portion (the portion R3) for an exposure manufacturing process to produce a semiconductor device 200. In operation S404, the processor 1101 retrieves an adjusting parameter, for example MEEF, for modifying the layout of the semiconductor device 200. In operation S406, the uniformity of critical dimension (CD) of the patterned layer PL2 is measured or simulated.

Afterwards, in operation S408, the processor 1101 determines a compensation amount (CA) based on the uniformity of CD and the adjusting parameter (i.e., MEEF). In operation S410, the processor 1101 determines a first compensation index C1 and a second compensation index C2. It should be noted that the operations S404~S410 could be executed at the same time, or be executed in another sequence.

In operation S412, the processor 1101 adjusts the CD of the second portion by utilizing the compensation amount multiplied by the first compensation index C1, and adjusts the CD of the third portion by utilizing the compensation amount multiplied by the second compensation index C2. The detailed adjustment method in association with related parameters has been illustrated before, and would not be repeated again. Afterwards, in operation S414, a modified layout is generated to compensate for the non-uniformity of the exposure manufacturing process. In some embodiment, the modified layout or a group of modified layouts are used to fabricate mask for manufacturing the IC 130.

In some embodiments, one or more of the operations and/or functions of the tools and/or systems described with respect to FIGS. 1-4 is/are implemented by specially configured hardware (e.g., by one or more application-specific integrated circuits or ASIC(s)) which is/are included) separate from or in lieu of the processor 610. Some embodiments incorporate more than one of the described operations and/or functions in a single ASIC.

In some embodiments, the operations and/or functions are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

By utilizing the proposed layout modification method, the non-uniformity during the exposure manufacturing process could be compensated and improved. Because arranging another thin film is not needed by the proposed layout modification method to absorb the light reflection and light leakage, the efficiency and throughput of the exposure manufacturing process will not be sacrificed.

In accordance with some embodiments, a layout modification method for fabricating an integrated circuit (IC) is provided. The layout modification method includes calculating uniformity of critical dimension (CD) of a patterned layer with a layout for an exposure manufacturing process to produce a semiconductor device. The patterned layer is divided into a first portion and a second portion which is adjacent to the first portion, and a width of the second portion equals to a penumbra size of the exposure manufacturing process. The layout modification method further includes retrieving an adjusting parameter for modifying the layout of the semiconductor device; determining a compensation amount based on the adjusting parameter and the uniformity of CD; and compensating the CD of the second portion of the patterned layer by utilizing the compensation amount to generate a modified layout.

In accordance with some embodiments, a layout modification method for fabricating an integrated circuit (IC) is provided. The layout modification method includes dividing a patterned layer of a layout into a first portion and a second portion for an exposure manufacturing process to produce a semiconductor device. A width of the second portion equals to a penumbra size of the exposure manufacturing process. The layout modification method further includes measuring uniformity of critical dimension (CD) of the patterned layer; determining an compensation amount based on the uniformity of CD and an adjusting parameter for modifying the layout of the semiconductor device; and adjusting the CD of the second portion of the patterned layer by utilizing the compensation amount to generate a modified layout.

In accordance with some embodiments, a non-transitory computer-readable medium containing instructions which, when executed by a processor of a computer system, cause the processor to execute a layout modification method for fabricating an integrated circuit. The layout modification method includes calculating uniformity of critical dimension (CD) of a patterned layer with a layout for an exposure manufacturing process to produce a semiconductor device. The patterned layer is divided into a first portion and a second portion which is adjacent to the first portion, and a width of the second portion equals to a penumbra size of the exposure manufacturing process. The layout modification method further includes retrieving an adjusting parameter for modifying the layout of the semiconductor device; determining a compensation amount based on the adjusting parameter and the uniformity of CD; and compensating the CD of the second portion of the patterned layer by utilizing the compensation amount to generate a modified layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout modification method for fabricating an integrated circuit, comprising:
    calculating uniformity of critical dimensions of a first portion and a second portion in a patterned layer using a layout for an exposure manufacturing process to produce a semiconductor device in the integrated circuit, wherein the second portion is adjacent to the first portion, and a width of the second portion equals a penumbra size of the exposure manufacturing process, wherein the penumbra size is utilized to indicate which area of the patterned layer is affected by light leakage exposure from another exposure manufacturing process;
    retrieving an adjusting parameter for modifying the layout;
    determining a compensation amount based on the adjusting parameter and the uniformity of the critical dimensions; and
    compensating the critical dimension of the second portion of the patterned layer by utilizing the compensation amount to generate a modified layout.

2. The layout modification method as claimed in claim 1, wherein the adjusting parameter is a Mask Error Enhancement Factor (MEEF) utilized for optical proximity correction of the exposure manufacturing process of the semiconductor device.

3. The layout modification method as claimed in claim 1, wherein the compensation amount is determined by dividing the uniformity of the critical dimension by the adjusting parameter.

4. The layout modification method as claimed in claim 1, wherein shape of the patterned layer is a polygon, the first portion is a central area of the polygon, and the second portion is an edge area of the polygon.

5. The layout modification method as claimed in claim 4, wherein the patterned layer further comprises a third portion which is different from the first portion and the second portion, and the third potion is a corner area of the polygon.

6. The layout modification method as claimed in claim 4, wherein the layout modification method further comprises:
    compensating the critical dimension of the third portion of the patterned layer by utilizing the compensation amount to generate the modified layout.

7. The layout modification method as claimed in claim 6, wherein the critical dimension of the second portion of the patterned layer is compensated by increasing a pattern width of the second portion or decreasing a pattern pitch of the second portion by the compensation amount which is multiplied by a first compensation index, the critical dimension of the third portion of the patterned layer is compensated by increasing a pattern width of the third portion or decreasing a pattern pitch of the third portion by the compensation amount which is multiplied by a second compensation index.

8. The layout modification method as claimed in claim 7, wherein the second compensation index is greater than the first compensation index.

9. A layout modification method for fabricating an integrated circuit, comprising:
    dividing a patterned layer of a layout into a first portion and a second portion for an exposure manufacturing process to produce a semiconductor device in the integrated circuit, wherein a width of the second portion equals a penumbra size of the exposure manufacturing process, and the penumbra size is utilized to indicate which area of the patterned layer is affected by light leakage exposure from another exposure manufacturing process;
    measuring uniformity of critical dimension of the patterned layer;
    determining a compensation amount based on the uniformity of critical dimension and an adjusting parameter for modifying the layout; and
    adjusting the critical dimension of the second portion of the patterned layer by utilizing the compensation amount to generate a modified layout.

10. The layout modification method as claimed in claim 9, wherein the adjusting parameter is a Mask Error Enhancement Factor utilized for optical proximity correction of an exposure manufacturing process of the semiconductor device.

11. The layout modification method as claimed in claim 9, wherein the compensation amount is determined by dividing the uniformity of critical dimension by the adjusting parameter.

12. The layout modification method as claimed in claim 9, wherein shape of the patterned layer is a rectangle, the first portion is a central area of the rectangle, and the second portion is an edge area of the rectangle.

13. The layout modification method as claimed in claim 12, wherein the patterned layer further comprises a third portion which is different from the first portion and the second portion, and the third potion is a corner area of the rectangle.

14. The layout modification method as claimed in claim 12, wherein the layout modification method further comprises:

adjusting the critical dimension of the third portion of the patterned layer by utilizing the compensation amount to generate a modified layout.

15. The layout modification method as claimed in claim 9, wherein the critical dimension of the second portion of the patterned layer is compensated by increasing a pattern width of the second portion or decreasing a pattern pitch of the second portion by the compensation amount which is multiplied by a first compensation index, the critical dimension of the third portion of the patterned layer is compensated by increasing a pattern width of the third portion or decreasing a pattern pitch of the third portion by the compensation amount which is multiplied by a second compensation index.

16. The layout modification method as claimed in claim 15, wherein the second compensation index is greater than the first compensation index.

17. A non-transitory computer-readable medium containing instructions which, when executed by a processor of a computer system, cause the processor to execute an layout modification method for fabricating an integrated circuit, comprising:
   calculating uniformity of critical dimension of a patterned layer with a layout for an exposure manufacturing process to produce a semiconductor device in the integrated circuit, wherein the patterned layer is divided into a first portion and a second portion which is adjacent to the first portion, and a width of the second portion equals a penumbra size of the exposure manufacturing process, wherein the penumbra size is utilized to indicate which area of the patterned layer is affected by light leakage exposure from another exposure manufacturing process;
   retrieving an adjusting parameter for modifying layout;
   determining an compensation amount based on the adjusting parameter and the uniformity of critical dimension; and
   compensating the critical dimension of the second portion of the patterned layer by utilizing the compensation amount to generate a modified layout.

18. The non-transitory computer-readable medium as claimed in claim 17, wherein shape of the patterned layer is a rectangle, the first portion is central area of the rectangle, the second portion is edge area of the rectangle, and the critical dimension of the second portion of the patterned layer is compensated by increasing pattern width of the second portion with the compensation amount or decreasing pattern pitch of the second portion with the compensation amount.

19. The non-transitory computer-readable medium as claimed in claim 17, wherein the compensation amount is determined by dividing the uniformity of the critical dimension by the adjusting parameter.

20. The non-transitory computer-readable medium as claimed in claim 17, wherein shape of the patterned layer is a polygon, the first portion is a central area of the polygon, and the second portion is an edge area of the polygon, and the patterned layer further comprises a third portion which is different from the first portion and the second portion, and the third potion is a corner area of the polygon.

* * * * *